United States Patent [19]

Kretschmer

[11] Patent Number: 4,772,060

[45] Date of Patent: Sep. 20, 1988

[54] AIR GUIDE ARRANGEMENT FOR THE UNDERSIDE OF A VEHICLE

[75] Inventor: Helmut Kretschmer, Bessenbach, Fed. Rep. of Germany

[73] Assignee: Porsche Aktiengesellschaft, Stuttgart, Fed. Rep. of Germany

[21] Appl. No.: 51,692

[22] Filed: May 20, 1987

[30] Foreign Application Priority Data

May 24, 1986 [DE] Fed. Rep. of Germany ....... 3617538

[51] Int. Cl.$^4$ ............................................. B62D 35/00
[52] U.S. Cl. .................................................. 296/180.1
[58] Field of Search ......................................... 296/1 S

[56] References Cited

U.S. PATENT DOCUMENTS

| | | | |
|---|---|---|---|
| 4,049,309 | 9/1977 | Seal | 296/1 S |
| 4,511,170 | 4/1985 | Sanberithi | 296/1 S |
| 4,569,551 | 2/1986 | Rauser et al. | 296/1 S |
| 4,673,206 | 6/1987 | Kretschmer et al. | 296/1 S |

FOREIGN PATENT DOCUMENTS 0083692  7/1983  Fed. Rep. of Germany .
1405928  6/1965  France .
2517273  6/1983  France .

OTHER PUBLICATIONS

Journal Plastverarbeiter (Processing of Plastic Materials), 35th Year, 1984, No. 7, pp. 46, 47.
Patent Abstract of Japan, p. 1772, M 78, JP-A 53 40 916.

*Primary Examiner*—Robert R. Song
*Attorney, Agent, or Firm*—Barnes & Thornburg

[57] ABSTRACT

A motor vehicle, particularly a passenger car, having an aerodynamically developed underside extending adjacent to the road has wheel houses for the front and rear wheels. In order to, with a good drag coefficient, generate an output that improves the driving behavior of the motor vehicle, inlet ducts are provided at the underside of the motor vehicle, seen in driving direction, in front of the wheel houses of the front and/or rear wheel. The inlet ducts extending upwardly and being open in downward direction and extending at the wheel houses between the wheels. An upper peripheral surface of the inlet ducts is formed by convexly extending shaped sections that lead into the wheel houses.

23 Claims, 2 Drawing Sheets

AIR GUIDE ARRANGEMENT FOR THE UNDERSIDE OF A VEHICLE

BACKGROUND AND SUMMARY OF THE INVENTION

The invention relates to a motor vehicle, particularly a passenger car, the underside of which that faces the road, has wheel housings for the front and rear wheels and has an aerodynamically streamlined shape over at least a substantial portion of said underside.

In the case of a known arrangement of the above-mentioned type, disclosed in German Utility Model (DE-GM) No. 80 23 035, the underside of the motor vehicle is developed with a smooth surface with assemblies and parts of the chassis, such as links, axles, or the like, being covered. By means of the smooth-surface development of the underside, the drag coefficient of the vehicle is reduced. However, it is a disadvantage in the case of this arrangement that in the area of the underside of the vehicle, no measures are taken for generating negative lift.

It is an object of the present invention to take such measures at the underside of a motor vehicle that, with a good drag coefficient, negative lift is generated that improves the driving behavior of the motor vehicle.

According to the invention, this object is achieved by providing downwardly open upwardly inclined air inlet ducts leading to the wheel housings, the upper peripheral areas of the inlet ducts being formed by convexly shaped sections.

The main advantages achieved by means of the invention are the fact that by means of the arrangement of inlet ducts in front of the wheel houses having convexly extending upper peripheries, diffuser areas are created at the underside that, seen in longitudinal direction of the vehicle, require little space, so that a relatively large-surface area of the underside can be used for the production of negative lift.

Negative lift is therefore produced only in the areas in front of the inlet ducts, since there the flow velocity is increased resulting in a reduction of pressure. In the wheel houses themselves, no negative lift is generated; they are used only for the discharge of the air to the diffuser areas, a low pressure level existing in the large-volume wheel houses that supports the discharge of air.

As a result of the shaped sections of the upper peripheries that extend convexly to the road, the flow, while utilizing the boundary layer effect, without detachment, rests against the upper peripheries of the inlet ducts. The inlet ducts may selectively be arranged in front of the front wheels or the rear wheels ,but also in front of the front wheels and the rear wheels, according to different preferred embodiments of the invention. By means of the latter arrangement, an optimized negative lift effect is achieved, because through the mounting of inlet ducts in front of the rear wheels, the negative lift effect is additionally improved in the area of the front wheels. In addition, the air flow in the area of the wheel houses can be used for brake cooling. A further improvement of the negative lift effect is achieved by means of the outlet ducts connected to the wheel houses.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
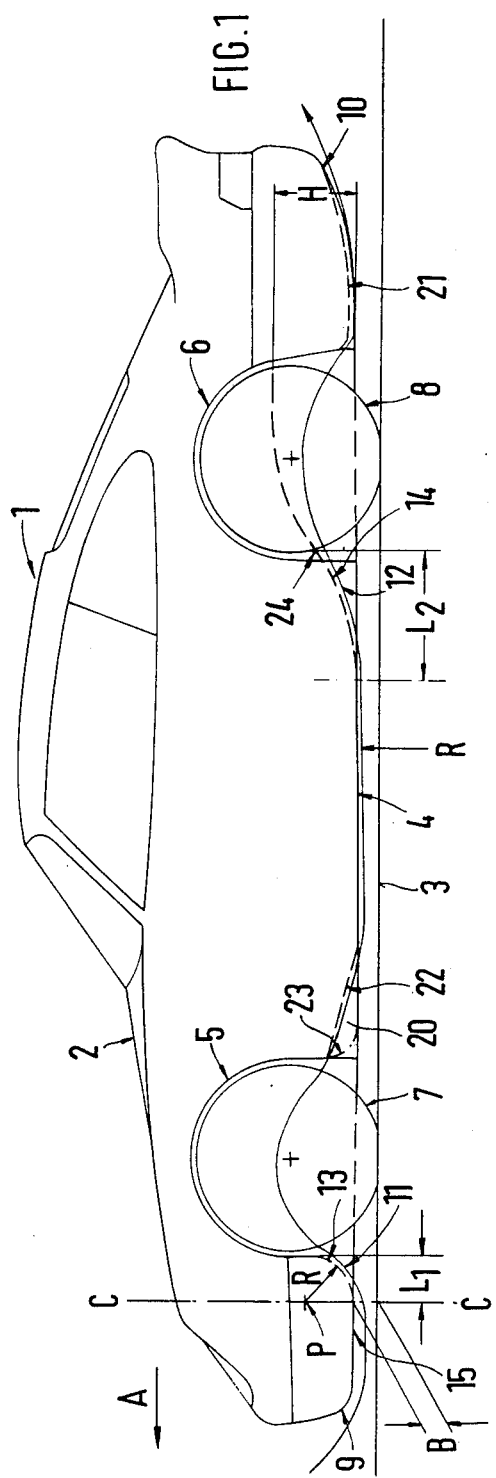
FIG. 1 is a lateral schematic view of a passenger car with the underside constructed according to a preferred embodiment of the invention.

The passenger car 1 comprises a body 2, the underside 4 of which extends adjacently to a road 3 and has an aerodynamically developed shape. The underside 4 is equipped with wheel houses 5, 6, for the front and rear wheels 7, 8. The smooth-surface underside 4 that extends between a flow-efficient shaped curved front part 9 and a diffusor-type rear area 10 can either be formed by a floor panel of the body 2 or a covering part that in addition is placed on the floor panel.

At the underside 4 of the passenger car 1, upwardly extending inlet ducts 11, 12 that are open toward the bottom are provided in front of the wheel houses 5, 6 of the front and/or rear wheels 7,8, seen in driving direction A. These inlet ducts 11, 12, as seen in transverse direction of the vehicle are located laterally inside next to the wheels 7, 8 leading into the wheel houses 5,6. An upper peripheral area of the inlet ducts 11, 12, is formed by convex shaped sections 13, 14 that are open toward the underside. The convex shaped section 13 of the front inlet duct 11 is developed to be radius-shaped (section of a cylinder). According to Figurie 1, it forms a quarter circle (90°). However, embodiments are also contemplated wherein the radius-shaped section 13 extends over an angle that is smaller than 90°. The radius-shaped section 13 is connected to the smooth-surface section 15 of the underside 4 that is located in front of it. The radius R depends on the ground clearance of the vehicle and is approximately equally large or larger than the distance B between the underside 4 and the road 3 in the area of a vertical auxiliary plane C—C cutting the zero point P of the radius R. Conventional vehicles have a distance B of approximately 50 to 200 mm, in which case the former value is applicable only to race cars while passenger cars have a larger distance B.

The inlet ducts 11 for the front wheel houses 5, seen in transverse direction of the vehicle, extends over the whole width D between an inner side 16 of the wheel 7 and an interior wall 17 of the wheel house in the illustrated preferred embodiment. In the illustrated preferred embodiment, the width D of the inlet ducts 11 correspond to the width of the vehicle wheels 7. However, embodiments are also contemplated wherein the inlet ducts 11 have a smaller width.

Laterally on the outside, next to the inlet ducts 11, 12, thus directly in front of the wheels 7, 8, cornered transitions 18, 19 are provided between the underside 4 and the wheel houses 5, 6, in which case tool-caused radiuses are admissible and are still considered to be cornered transitions. However, in front of the wheels 7, 8, displacement bodies may also be arranged that are not shown in detail, and that are directed downward and cause a lateral flow around the wheels 7, 8.

By means of the upwardly extending convex inlet ducts 11, 12, a diffusor effect is generated. The flow velocity of the air is increased in the area in front of the diffusor, whereby at the same time, a pressure reduction takes place and thus an antilift force is generated in this area. By means of the shaped sections 13, 14 of the upper peripheral areas extending convexly with respect to the road, the air is led upward, while utilizing the boundary layer effect without detachment, into the wheel houses 5, 6. If necessary, the upward-guided air can also be used for the cooling of brakes.

For a better discharge or further guiding of the air from the wheel houses 5, 6, outlet ducts 20, 21 are provided behind the wheels 7,8. Corresponding to Figure 2, an outlet duct 20 is connected to the front wheel house 5, that is arranged as an extension of the inlet duct 11. The outlet duct 20 extends only over a short partial area of the underside 4. The upper peripheral area 22 of the outlet duct 20 is developed in a straight line.

The outlet duct 20 has at least the width of the inlet duct 11. The cross-section of the outlet duct 20 is reduced continuously against the driving direction A and enters into the smooth-surface contour of the underside 4.

The inlet duct 12 for the rear wheel house 6 extends over a length L2 that is longer than the length L1 of the inlet duct 11 for the front wheel house 5. The upper peripheral area 14 of the rear inlet duct 12 is formed by a radius-shaped or curve-shaped section 14 that also rises slightly against the driving direction A and has a flatter curvature than the radius-shaped section 13 of the front inlet duct 11. The flatter curvature for the shaped section 14 is a result of the lower energy of the air in the rear area of the underside 4. The rear inlet duct 12, at its front end, preferably has a larger width and then narrows toward the wheel house 6. At the same time, the height of the inlet duct 12 increases against the driving direction A. The inlet duct 12, seen in longitudinal direction of the vehicle, extends in front of the wheel house 6 and ends approximately in the area of the theoretical intersection point 24 between the shaped section 14 and the wheel 8. However, embodiments are also contemplated wherein the inlet duct 12 is arranged further in the rear.

In the case of a low vacuum in the area of the rear wheel house 6, said wheel house 6, over its whole transverse course, may have a constant cross-section or a constant height (as shown at the front wheel house 5).

If, however, because of fenders that are bent out far to the outside, high vacuums exist in the area of the rear wheel house 6, it is advantageous if the rear wheel house 6, laterally next to the wheel 8, has a lower height H than in the area of the wheel 8. By this measure, it is achieved that the air rising in the wheel house 6 does not flow laterally out of the wheel house 6, but escapes toward the rear via the outlet ducts 21. The height H is determined empirically for each vehicle.

Figure 2:
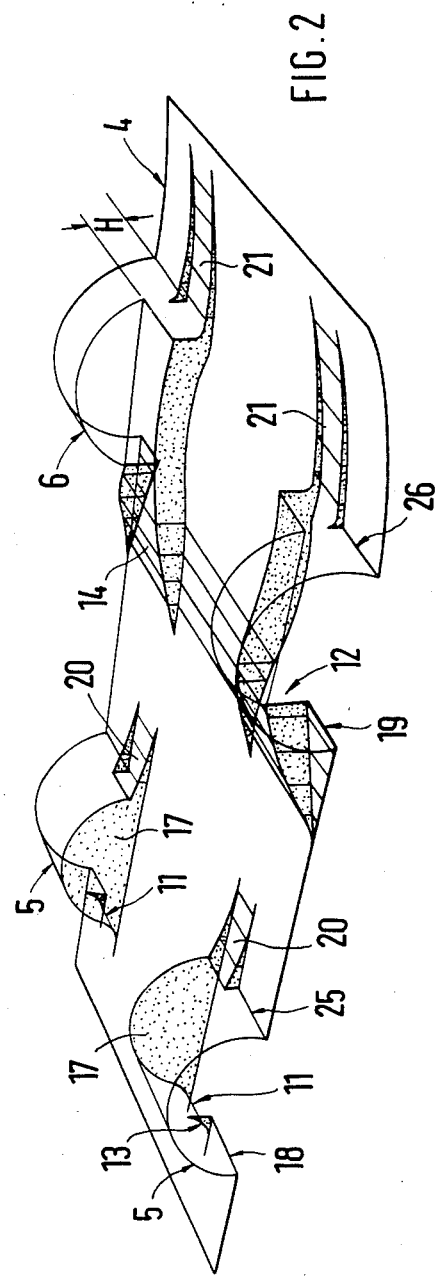
FIG. 2 is a schematic perspective view from above depicting the underside and the wheel houses of the passenger car of FIG. 1.
Figure 3:
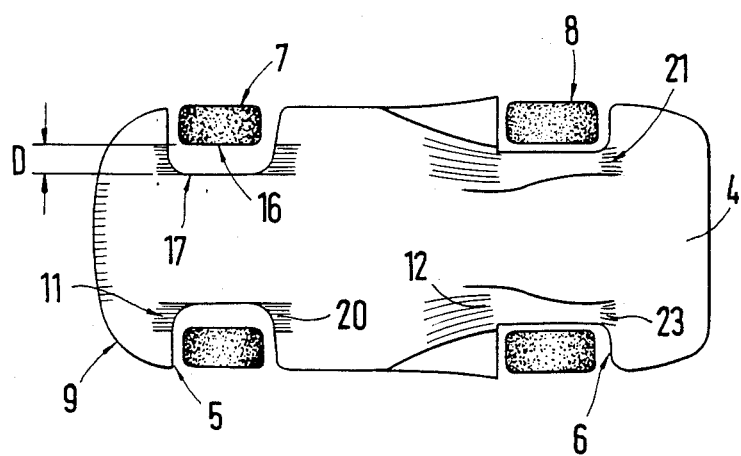
FIG. 3 is a smaller-scale schematic view taken in the direction of the arrow R of FIG. 1 onto the underside of the motor vehicle.

The outlet duct 21 that is connected to the rear wheel house 6 behind the wheel 8, corresponding to Figure 1 and 2, extends approximately to the rear end of the underside 4. However, embodiments are also contemplated wherein the outlet ducts 20, 21 are formed only by a short convex transition 23 between the wheel houses 5, 6 and adjacent sections of the underside 4. The transition 23 is preferably developed as a radius, in which case the size of the radius is selected in such a way that separation-free flow of air is ensured. In FIG. 1, the transition 23 is dash-dotted in the case of the front outlet duct 20. Also, the outlet ducts 21 in FIG. 3 are developed as convex transitions 23, i.e., the outlet ducts 21 end shortly behind the wheel houses 6.

The transitions 25, 26 between the wheel houses 5, 6 and the underside 4 located laterally next to the outlet ducts 20, 21, thus directly in front of the wheels, are developed to be cornered, in which case here also tool-caused radiuses are permissible.

The course of the flow flowing through under the passenger car 1 between the underside 4 and the road 3 is shown schematically in FIG. 1.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A motor vehicle, particularly a passenger car, the underside of which extending adjacent to the road, at least in areas, has an aerodynamically developed shape and wheel houses for the front wheels and the rear wheels wherein, at the underside of the motor vehicle—seen in driving direction—in front of the wheel houses of the front and/or rear wheels, upwardly inclined air inlet ducts that are open in downward direction are provided that extend into the wheel houses between the wheels, upper peripheral areas of the inlet ducts being formed by convexly extending shaped sections.

2. A motor vehicle according to claim 1, wherein the shaped section of the inlet duct is formed to be radius-shaped.

3. A motor vehicle according to claim 2, wherein the radius-shaped section is tangentially connected to the smooth-surface section of the vehicle underside that is located in front of it.

4. A motor vehicle according to claim 2, wherein the radius of the shaped section is approximately equally large or larger than the distance between the vehicle underside and the road in the area of a vertical auxiliary plane intersecting the center point of the radius.

5. A motor vehicle according to claim 1, wherein the inlet duct for the front wheel house extends at least over a partial area of the width between the interior side of the wheel and the interior wall of the wheel house.

6. A motor vehicle according to claim 1, wherein a cornered transition is provided between the underside and the wheel house as seen in driving direction, directly in front of the wheels.

7. A motor vehicle according to claim 2, wherein the front wheel house is equipped with an outlet duct, behind the wheel.

8. A motor vehicle according to claim 7, wherein the outlet duct extends only over a partial area of the underside.

9. A motor vehicle according to claim 7, wherein the outlet duct is formed by a depression of the vehicle underside that is directed upward.

10. A motor vehicle according to claim 7, wherein the outlet duct has at least the width of the inlet duct and forms an extension of the inlet duct.

11. A motor vehicle according to claim 7, wherein the cross-section of the outlet duct is reduced continuously against the driving direction.

12. A motor vehicle according to claim 7, characterized in that the outlet ducts are formed by a convex transition between the wheel house and an adjacent section of the vehicle underside.

13. A motor vehicle according to claim 1, wherein the inlet duct for the rear wheel house extends over a length that is longer than the length of the inlet duct for the front wheel house.

14. A motor vehicle according to claim 13, wherein the upper peripheral surface of the rear inlet duct is formed by a radius-shaped or curved shaped section, said shaped section being provided with a flatter curvature than the shaped section of the front inlet duct.

15. A motor vehicle according to claim 13, wherein the width of the inlet duct is reduced in the direction toward the wheel house.

16. A motor vehicle according to claim 1, wherein the rear wheel house is provided with an outlet duct, behind the wheel.

17. A motor vehicle according to claim 13, wherein the inlet duct ends in an area of the rear wheel house.

18. A motor vehicle according to claim 1, wherein the rear wheel house laterally next to the wheel has a lower height than in the area of the wheel.

19. A motor vehicle exterior body arrangement for the underside of a motor vehicle of the type comprising wheel housings, comprising air inlet duct means opening into at least one of the wheel housings, the first end of said air inlet duct means being open in the downward direction and being configured to generate negative lift on a motor vehicle in response to air flow under the vehicle during driving operations.

20. A body arrangement according to claim 19, wherein said air inlet duct means open into the at least one wheel housing at a position spaced laterally inside of a wheel housed by said wheel housing during normal driving operations.

21. A body arrangement according to claim 20, wherein said air inlet duct means exhibit a convexly shaped section having a radius corresponding to the distance between a rod surface and the adjacent underside of a motor vehicle.

22. A body arrangement according to claim 20, wherein separate ones of said air inlet duct means are provided for each front wheel housing of the vehicle.

23. A body arrangement according to claim 22, wherein separate ones of said air inlet duct means are provided for each rear wheel housing of the vehicle.

* * * * *